United States Patent [19]

Krippelz

[11] Patent Number: 5,410,934

[45] Date of Patent: May 2, 1995

[54] SWIVELABLE GUIDE HEAD FOR BAND SAW ADAPTABLE FOR WIDE AND NARROW SAW BLADES

[75] Inventor: Jacob Krippelz, Oswego, Ill.

[73] Assignee: Jake's Machining & Rebuilding Service, Inc., Aurora, Ill.

[21] Appl. No.: 203,703

[22] Filed: Feb. 28, 1994

Related U.S. Application Data

[63] Continuation of Ser. No. 35,407, Mar. 23, 1993, abandoned.

[51] Int. Cl.⁶ .......................... B26D 1/54; B27B 13/10
[52] U.S. Cl. .......................................... 83/820; 83/824
[58] Field of Search ................. 83/820, 821, 823, 824, 83/825, 826, 287, 829, 809, 810

[56] References Cited

U.S. PATENT DOCUMENTS

| | | | |
|---|---|---|---|
| 836,446 | 11/1906 | Kaudela | 83/824 |
| 1,233,836 | 7/1917 | Blum | 83/824 X |
| 1,357,328 | 11/1920 | Killander | 83/820 X |
| 1,415,386 | 5/1922 | Paddock | 83/825 |
| 1,719,927 | 7/1929 | Dougherty | 83/824 |
| 1,783,330 | 12/1930 | Edwards | 83/820 X |
| 2,549,384 | 4/1951 | Radecki et al. | 83/825 X |
| 2,695,637 | 11/1954 | Ocenasek | 83/820 X |
| 2,705,510 | 4/1955 | Stocke | 83/820 X |
| 2,843,917 | 7/1958 | Crane et al. | 83/820 X |
| 3,068,734 | 12/1962 | Braun | 83/820 X |
| 3,220,446 | 11/1965 | Burkey | 83/820 X |
| 3,668,961 | 6/1972 | Blue | 83/820 X |
| 3,815,465 | 6/1974 | Smierciak | 83/820 |
| 4,016,856 | 4/1977 | McLaughlin | 83/820 X |
| 4,036,269 | 7/1977 | Rhodes | 83/809 X |
| 4,109,554 | 8/1978 | Rhodes et al. | 83/820 X |
| 4,195,543 | 4/1980 | Tapply et al. | 83/820 X |
| 4,327,621 | 5/1982 | Voorhees et al. | 83/820 |
| 4,342,241 | 8/1982 | Eklund | 83/820 X |
| 4,920,846 | 5/1990 | Duginske et al. | 83/820 |

FOREIGN PATENT DOCUMENTS

| | | | |
|---|---|---|---|
| 464742 | 5/1950 | Canada | 83/820 |
| 669477 | 8/1929 | France | 83/825 |
| 608767 | 9/1948 | United Kingdom | 83/820 |

*Primary Examiner*—Richard K. Seidel
*Assistant Examiner*—Clark F. Dexter
*Attorney, Agent, or Firm*—McCaleb, Lucas & Brugman

[57] ABSTRACT

The guide head is used in pairs secured above and below the work table of a band saw machine, to twist the blade up to 90° enabling the machine to cut off a length of a work piece exceeding the throat dimension of the machine. Each guide head comprises a casing having a plug swivelable up to 90° within it. Each swivelable plug has a vertical opening through which a saw blade can be trained. Each plug has upper and lower pairs of side guide rollers rotatably journaled on spaced, parallel, removeable pintles. Each roller has large- and small-diameter cylindrical end portions. The large-diameter portions are spaced apart to engage opposite sides of a band saw blade trained through the swivelable plug.

6 Claims, 5 Drawing Sheets

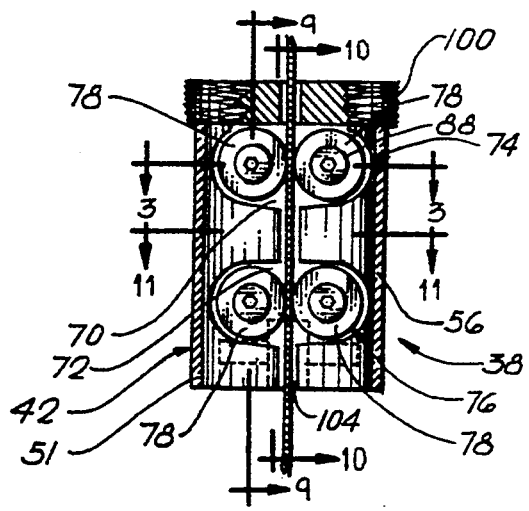
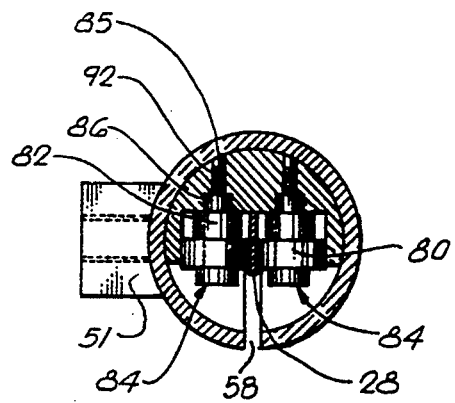
FIG. 3
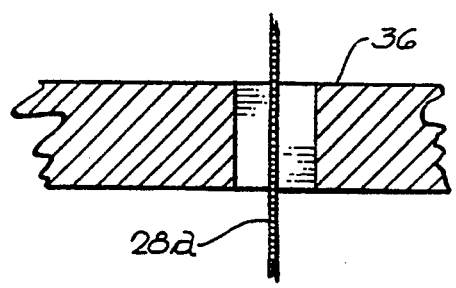
FIG. 2
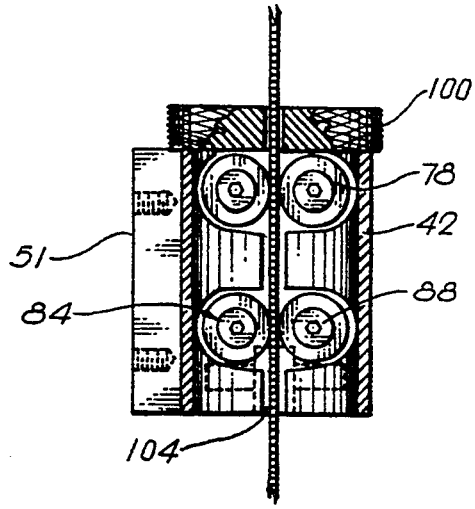
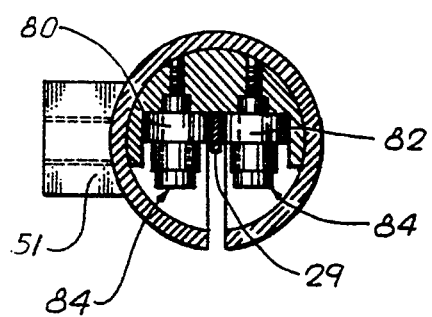
FIG. 4
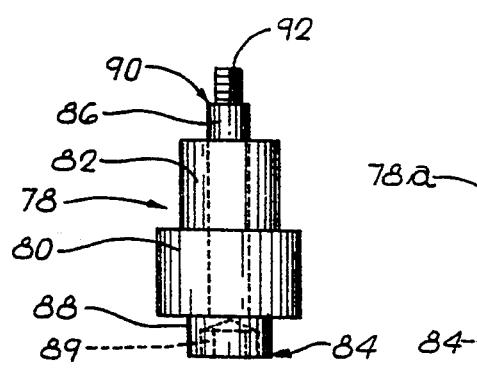
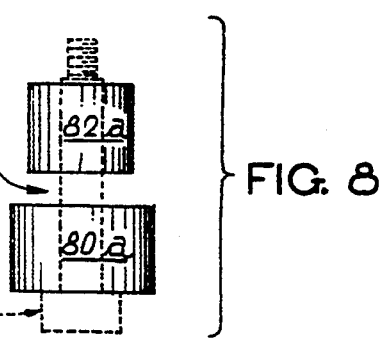
FIG. 7  FIG. 8

SWIVELABLE GUIDE HEAD FOR BAND SAW ADAPTABLE FOR WIDE AND NARROW SAW BLADES

This is a continuation of application Ser. No. 08/035,407 filed on Mar. 23, 1993, now abandoned.

BACKGROUND OF THE INVENTION

This invention relates generally to band saw machines and particularly to swivelable guide heads adapted to be mounted respectively above and below the work table to twist the band saw blade through a range of swiveled positions.

Band saw machines typically have upper and lower pulleys positioned respectively above and below a horizontal work table. An endless band saw blade is trained between the pulleys with the forward, cutting strand trained for vertical downward movement at the forward portion of the work table. A vertical structural column at the back of the work table connects an upper portion of the frame to a base beneath the table. The upper pulley is secured to the upper part of the frame and the lower pulley is secured to the base.

As a rule, the blade cuts sidewise and a standard band saw machine can cut off only comparatively short portions of a work piece limited to the "throat" of the machine. The throat is the fore and aft distance along the work table between the cutting strand of the saw blade and the above-mentioned vertical structural column, or the upwardly moving return strand of the saw blade at the back of the machine. Only very special purpose machines, with oversize throats, which are expensive and bulky, are capable of cutting off substantially long pieces, and the cut-off lengths of these pieces are still limited to the size of the throat.

Attempts have been made to provide pairs of swivelable band saw guides which grip the cutting strand of the blade above and below the work table and are constructed in such a manner that the blade may be twisted to enable a work piece to be cut off without contacting either the back structural column of the frame, or the return strand of the blade.

One example of this is shown in Edwards U.S. Pat. No. 1,783,330 issued Dec. 2, 1930 on a "Saw Guide". However, the saw guide proposed in that patent had severe limitations. The side guide rollers were limited-contact rollers and did not provide sufficiently wide engagement with the sides of a saw blade to twist the blade anywhere close to 90° as is possible with the present invention. Further, in the guide head shown in that prior art patent, there was no provision for optionally adapting the side guide rollers to wide or narrow blade use. In fact, the variety of wide and narrow band saw blades, which are readily available today for cutting metallic and non-metallic materials, was unknown in 1929 when the Edwards patent application was filed. For that reason, an important feature of the present invention, namely the capability of adapting the guide heads for optional use with wide or narrow blades, is not taught by this prior art patent.

A problem which is common to band saws is that they tend to deviate from the desired cutting path, with this tendency increasing as the blade departs more and more from its intended path. One reason advanced for this phenomenon is that the teeth are not manufactured with sufficient accuracy to result in equal cutting forces being produced on both sides of the blade, and thus the cutting edge tends to track to one side or the other of the desired cutting path. As the blade progresses through the material in this abnormal posture, the material itself applies a force to the flat side of the blade which is presenting itself to the oncoming material. This tends to increase the lateral deflection of the blade so that the blade deviation from its intended track is continuously increased. Furthermore, blade deviation is more pronounced at higher feed rates of the material past the blade.

To maintain the desired cutting direction, especially while the blade is twisted as much as 90° as is possible with the present invention, it is important that the side guide rollers in the swivelable guides engage the full width of the blade beginning immediately behind the edge with the cutting teeth.

SUMMARY OF THE INVENTION

The present invention overcomes the above-described difficulties and disadvantages of the prior art by providing a swivelable plug through which a band saw blade may be trained, and providing improved side guide roller means which has substantial cylindrical contact with both sides of the blade beginning immediately behind the forward, toothed edge, for both wide and narrow saw blades.

An important feature of this invention is that the side guide rollers have large diameter and small diameter cylindrical portions at opposite ends, and these are readily reversible to adapt the heads for optional use either with standard, wide or narrow band saw blades.

BRIEF DESCRIPTION OF THE DRAWINGS

Other objects and advantages will be apparent from the accompanying drawings in which:

FIG. 2 is a fragmentary enlarged cross section of FIG. 1;

FIG. 3 is a cross section of FIG. 2 taken along line 3—3 showing the side guide rollers adjusted to support a relatively wide saw blade;

FIG. 4 is a view similar to FIG. 3 showing the side guide rollers reversed end-for-end to support a relatively narrow saw blade;

FIG. 7 is a fragmentary, enlarged view of one of the side guide rollers and corresponding pintle shown in the previous figures;

FIG. 8 is a view to the same scale as FIG. 7 showing an alternative side guide roller arrangement;

Like parts are designated by like reference numerals throughout the figures of the drawings.

DETAILED DESCRIPTION OF THE PREFERRED EMBODIMENTS

Figure 17:
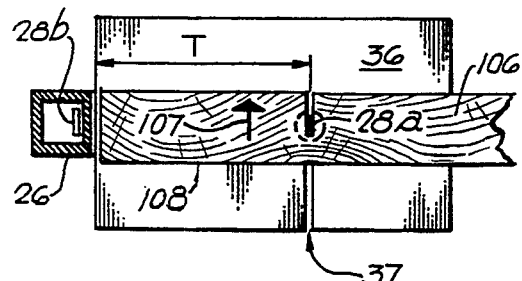
FIG. 17 is a fragmentary, schematic view taken in a horizontal plane indicated by the line 17—17 in FIG. 1, this view showing the cutting strand of the band saw blade in the normal, untwisted position of FIG. 11, and illustrating how the length of a cut-off portion of a work piece is limited to the throat dimension of the machine.
Figure 15:
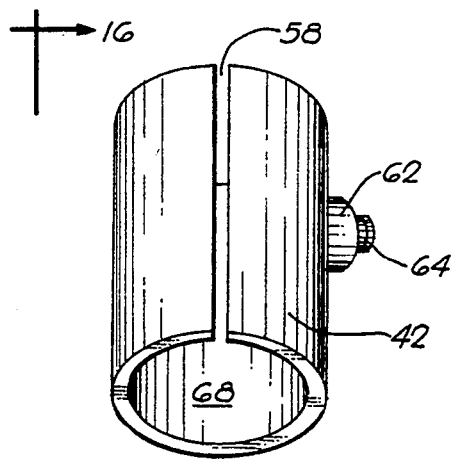
FIG. 15 is an enlarged perspective view of casing member for the plug member shown in FIG. 14.
Figure 16:
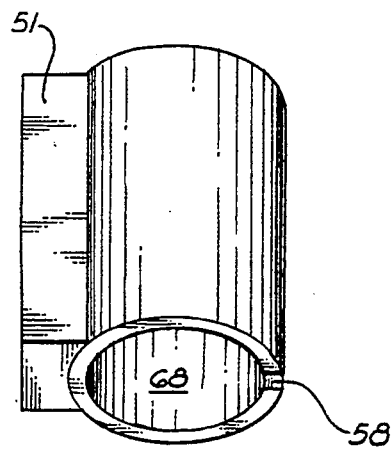
FIG. 16 is a perspective view of the casing member as seen generally in the direction of the arrows 16—16 in FIG. 15.

Referring now to the specific embodiment of the invention shown in the drawings, a band saw machine 20 comprises a frame having a base 22 and an upper cantilever arm 24 connected to the base by a rearwardly positioned vertical post 26. An endless band saw blade 28 is trained between upper and lower pulleys 30 and 32 which are rotatably journaled on the arm 24 and base 22 respectively. A motor 34 drives the pulleys clockwise, moving a cutting strand 28a of the saw blade downwardly through an opening 35 in work table 36, and moving a return strand 28b of the blade upwardly through the vertical column 26. As best shown in FIG. 17, the work table 36 has a vertical slit 37 to facilitate insertion of the blade 28 into the opening 35.

Figure 1:
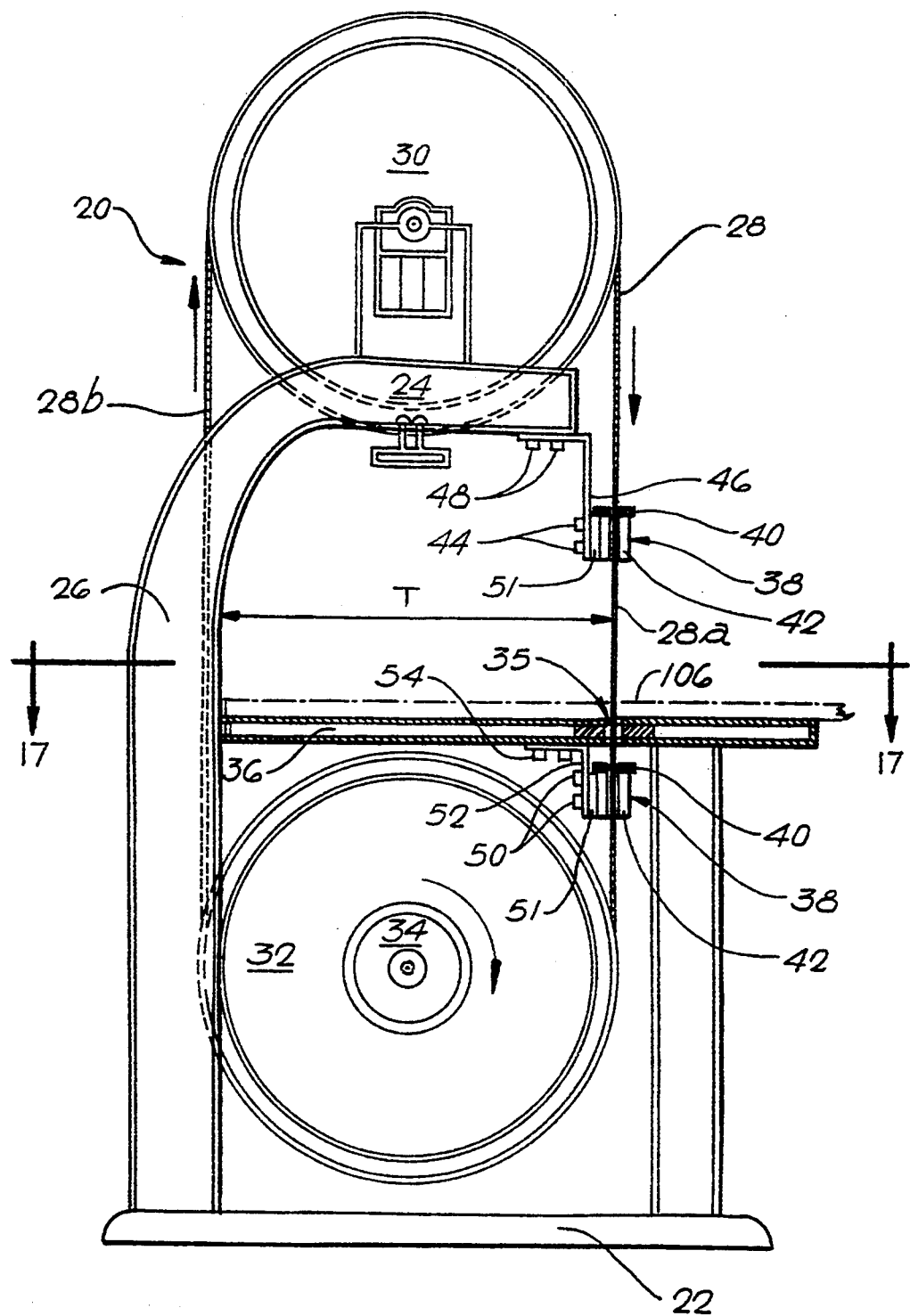
FIG. 1 is a front elevation of a band saw machine equipped with a pair of swivelable guide heads according to the present invention.

Referring now more specifically to the present invention, a pair of swivelable guide heads 38 are secured to the frame respectively above and below the work table 36 as best shown in FIGS. 1 and 2. The swivel heads 38 are identical. Each comprises a plug 40 which is rotatably journaled in a casing 42 which is provided with a vertical mounting lug 51 on the back side.

The internal details of each swivel head 38 will now be described. Both swivel heads are secured along the path of the cutting strand 28a of the blade by substantially identical mounting means. The casing 42 of the upper swivel head is fastened by bolts 44 to an L-shaped bracket 46 which, in turn, is mounted to the underside of arm 24 by bolts 48. Similarly, the casing 42 of the lower swivel head, beneath the work table, is secured by bolts 50 to an L-shaped bracket 52 which, in turn, is secured to the underside of the work table by bolts 54.

Inasmuch as the swivelable guide heads 38 are identical, only the upper one will be described in detail.

Each casing 42 comprises a cylindrical body 56 with a fully open longitudinal slit 58 to enable insertion of the band saw blade 28. The mounting lug 51 is drilled and tapped as shown at 60 (FIGS. 11 and 13) to receive external bolts 44 (or 50, for the lower guide head). An external circular boss 62 is drilled and tapped to receive a screw-threaded detent member 64 having a spring-loaded ball detent 66 to releasably lock the swivelable plug in a plurality of discrete, swiveled positions to be described.

The swivelable plug 40 has an external cylindrical surface 67 swivelably journaled in circular bore 68 in the casing body 56. The plug has a pair of upper and lower recesses 70 and 72 within which are located upper and lower pairs of horizontally spaced side guide rollers. An upper pair of side guide rollers generally designated 74 is located in the upper recess 70 of the plug 40 a lower pair 76 of side guide rollers are located in the lower recess 72. Alternatively, only a single pair (74 or 76) of rollers may be needed in some light duty machines.

The individual rollers are designated 78, one of which is shown enlarged and in detail in FIG. 7.

Each roller 78 has a large diameter cylindrical end portion 80 and a small diameter cylindrical end portion 82. These may be integral as shown in FIG. 7, or comprise separate portions as shown in FIG. 8 where the separate portions are designated 80a and 82a respectively.

Each roller 78 is rotatably journaled on a pintle 84 which comprises an intermediate shaft portion 86, a head 88 with a wrench-engagable socket 89, an inner end shoulder 90, and a reduced-diameter threaded inner end section 92 threadedly engaged with a corresponding screw-threaded bore 85.

Only the large-diameter roller portions 80 (or 80a in the embodiment shown in FIG. 8) engage the band saw blade. The pintles 84, 84 are horizontally spaced to provide room for the saw blade between the large diameter roller portions 80, 80.

Figure 5:
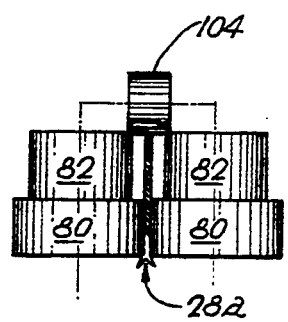
FIG. 5 is a fragmentary enlarged view of the roller and wide blade shown in FIG. 3.
Figure 6:
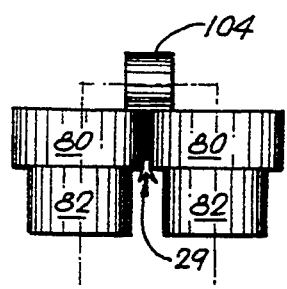
FIG. 6 is a fragmentary enlarged view of the rollers and narrow blade shown in FIG. 4.
Figure 9:
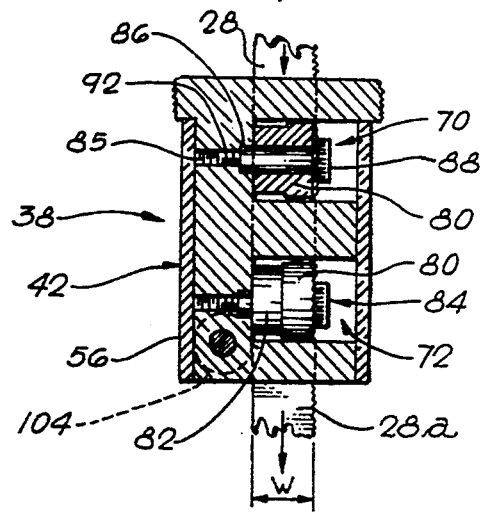
FIG. 9 is a fragmentary vertical cross section of FIG. 2 taken along line 9—9.
Figure 10:
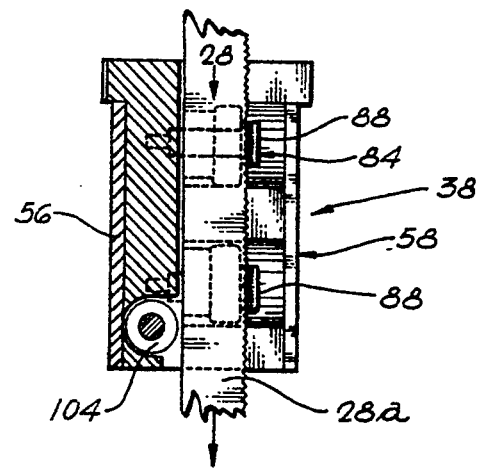
FIG. 10 is a fragmentary vertical cross section of FIG. 2 taken along line 10—10.

The combination of these different-diameter roller end portions, with their reversibility on pintles 84, is important in optionally adapting the swivel heads 38, 38 to a relatively wide saw blade 28 as illustrated in FIGS. 3 and 5, or to a relatively narrow saw blade 29 as illustrated in FIGS. 4 and 6. By way of illustration but not by way of limitation, the width W (FIG. 9) may be ½" for a standard wide blade 28 and the corresponding width W may be ¼" for the narrow blade 29. The wide blade is used primarily for straight cuts, and the narrow blade is used primarily for curved and arcuate cuts, and circles.

Figure 11:
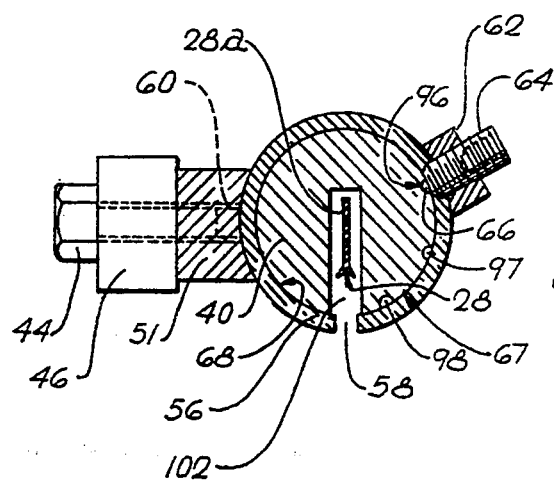
FIG. 11 is an enlarged horizontal cross section of FIG. 2 taken along line 11—11.
Figure 13:
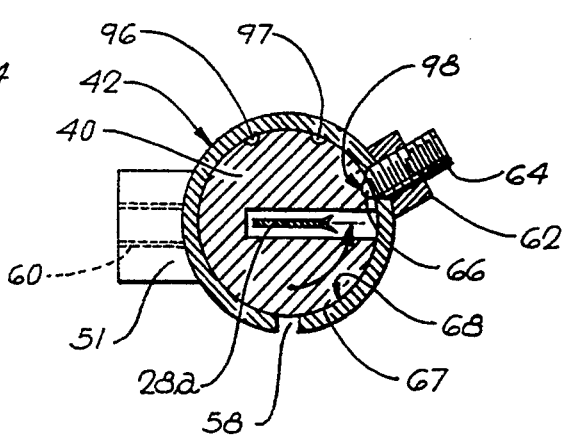
FIG. 13 is a view similar to FIG. 11, taken along line 13—13 of FIG. 12 showing the cutting strand of the blade rotated 90° clockwise with respect to its position in FIGS. 2, 3 and 11.
Figure 12:
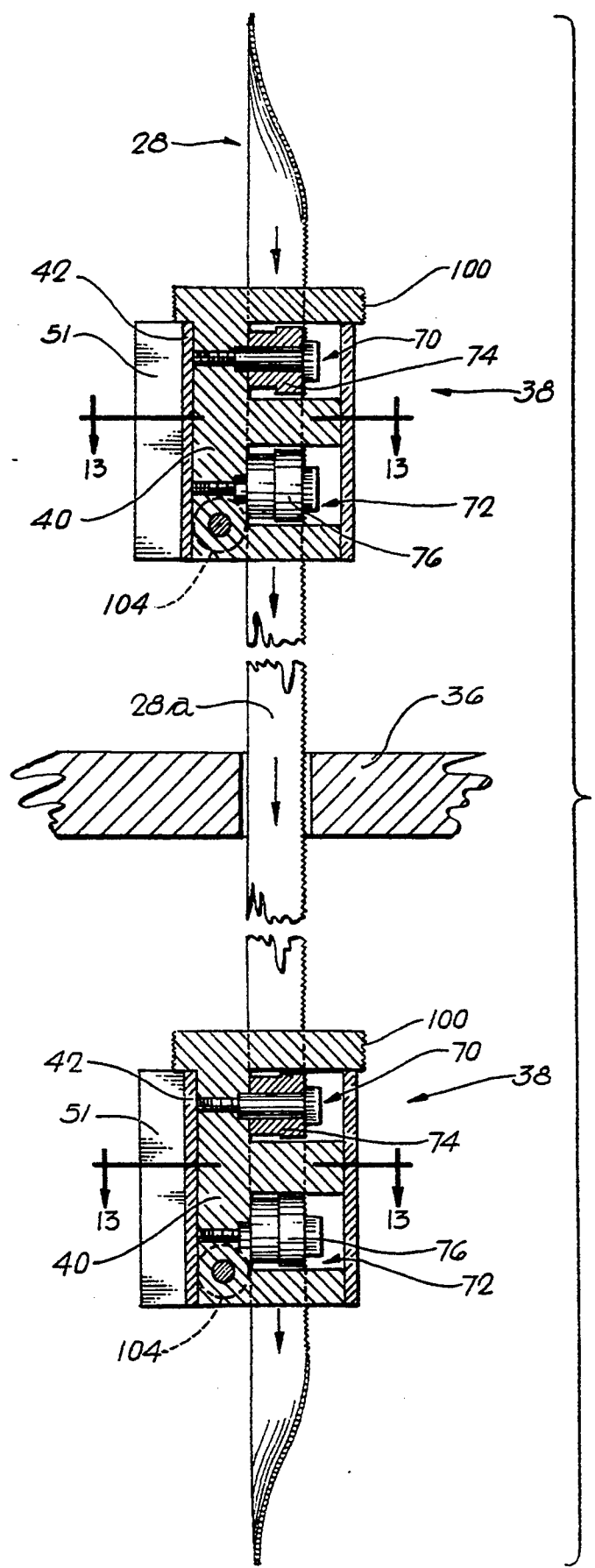
FIG. 12 is a vertical cross section similar to FIG. 2 with the swiveling heads rotated 90° clockwise (looking down) to twist the saw blade at right angles relative to its position shown in FIGS. 2, 3 and 11.
Figure 14:
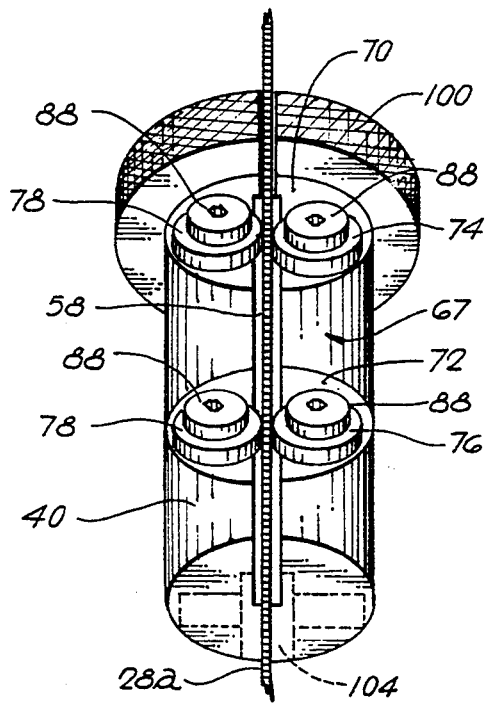
FIG. 14 is an enlarged perspective view of one of the rotatable plug members shown in the previous figures.

As best shown in FIGS. 11 and 13, the swivelable plug 40 has a plurality of detent recesses 96, 97, and 98 which receive the detent ball 66 to releasably hold the plug at a desired swiveled position within the casing. The detent recesses are 45° apart in the example shown. For the untwisted position of strand 28a shown in FIGS. 1, 2 and 11, detent ball 66 would be seated in recess 96. To twist the blade 45° or 90°, the operator would grip the knurled flanges 100 of both the upper and lower heads 38, and rotate them in the same direction to seat the balls 66 in the respective recesses 97 or 98. FIGS. 12 and 13 show the plugs 40 rotated a full 90° in the direction of the arrow in FIG. 13. As best shown in FIG. 11, the plug 40 has a vertical groove 102 which registers with the vertical slit 58 in the casing in the untwisted position of cutting strand 28a to enable insertion and removal of the blade 28.

The saw blade cutting strand 28a is positively guided and steered in each head 38 by side guide rollers 78, 78 and by a back up roller 104 which engages the back edge of the blade. These are best shown in FIGS. 3 and 4, and in FIGS. 5 and 6 for wide and narrow saw blades 28 and 29 respectively.

For positive steering of the blade, especially at the full 90° twist position shown in FIGS. 12 and 13, the large diameter end portions 80, 80 fully engage the blade immediately behind the teeth, and for a substantial width behind the teeth. This is made possible by orienting the rollers with their large diameter portions 80, 80 positioned forwardly in FIGS. 3 and 5 for a wide blade, and by reversing their positions so the large diameter portions 80, 80 are positioned rearwardly, as shown in FIGS. 4 and 6, for a narrow blade 29.

Use and operation of the improved swivelable guide heads 38 is believed apparent in view of the foregoing description.

Briefly, however, if the cutting strand 28a is in the untwisted condition shown in FIGS. 1 and 17, the work piece 106 must be moved, in the direction of arrow 107, and the length of the cut off portion 108 will be limited to the throat dimension T which is the distance between the blade cutting strand 28a and back post 26.

Figure 18:
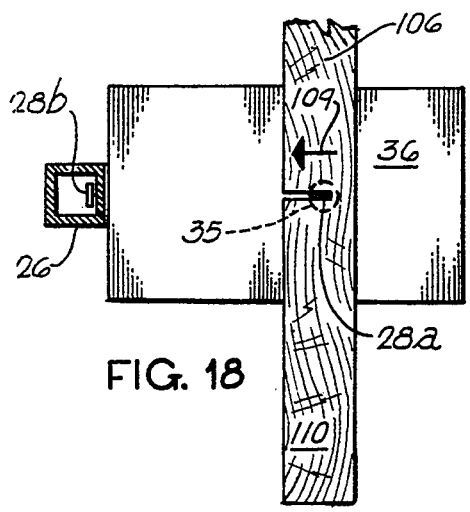
FIG. 18 is a view similar to FIG. 17 showing the cutting strand of the band saw blade twisted ninety degrees clockwise to the position shown in FIGS. 12 and 13.

On the other hand, by swivelling the plugs 40 a full 90° counterclockwise (looking down) to twist the cutting strand 28a as shown in FIGS. 12, 13 and 18, the work piece 106 may be moved leftwise, in the direction of arrow 109, and there would be no limit imposed by the machine to the length of the cut off portion 110.

In like fashion the plugs 40 may be swivelled 45°, to a position halfway between FIGS. 11 and 13, to engage detent ball 66 in recess 97. This orients the work piece at 45° (this position not specifically shown) likewise enabling a portion of the work piece to be cut off without limitation to the throat dimension T.

The embodiments described and shown to illustrate the present invention have been necessarily specific for purposes of illustration. Alterations, extensions and modifications would be apparent to those skilled in the art. The aim of the appended claims, therefor, is to cover all variations included within the spirit and scope of the invention.

The embodiments of the invention in which an exclusive property or privilege is claimed are defined as follows:

1. A guide for relatively wide and narrow width endless band saw blades, each blade having a vertically downwardly moveable cutting strand with cutting teeth along a front cutting edge and a parallel non-cutting back edge comprising:
   an elongated rigid casing having a lengthwise extending, open ended, cylindrical bore and a lengthwise extending blade-receiving slit through a wall thereof, said slit openly communicating with said bore; an external lug on said casing for mounting the same in a vertical operating position such that the casing surrounds the vertical movement path of the blade's cutting strand; and manually actuated spring loaded means mounted on said casing for movement radially into and out of said bore;
   a unitary plug having a cylindrical body axially coextensive with and rotatably journaled in said bore and a radially extending flange abutting an upper end of said casing; said plug having a lengthwise, radially inwardly extending groove which is registeringly alignable with said slit to afford entry of said cutting strand into said plug for free passage in and along said groove;
   manually engageable means on said flange for gripping said plug to rotatably move said plug relative to said casing; said body having a plurality of circumferentially spaced depressions in its periphery which are aligned to cooperate with said manually actuated means in response to selective rotation of said plug to lock said plug in predetermined indexed positions relative to said casing, said body also having a pair of transverse recesses extending laterally with respect to a longitudinal axis of said body and formed in one side thereof such that the recesses are vertically spaced along said longitudinal axis and extend horizontally when said casing is in said operating position;
   plural, parallel, fixed, pintles secured to said body within said recesses; said pintles extending in cantilever fashion wherein each recess has at least two pintles spaced from one another so that they extend along opposite sides of and parallel to said cutting strand which is in said groove,
   a side guide roller rotatably journaled on and axially secured to each of said pintles, each said roller comprising two coaxially aligned cylindrical end portions, one of which portions is of distinctly larger diameter than the other and presents a cylindrical blade engaging exterior surface of sufficient diameter and axial extent to laterally engage and guide a substantial width of the saw blade's cutting strand measured from immediately behind the teeth along the front cutting edge thereof to the back edge thereof.

2. The guide of claim 1, wherein said pintles are arranged in co-planar, laterally spaced relation in each of said recesses for mounting a pair of rollers therein; the rollers of each pair thereof being laterally spaced, in opposing relationship to engage opposite sides of said cutting strand therebetween; the pairs of rollers being vertically spaced to positively support and steer said cutting strand at and along vertically spaced contact areas when angularly twisting said cutting strand to selected twisted positions in response to rotation of said plug to and from said predetermined indexed positions.

3. The guide of claim 2, wherein said depressions are arranged on said body to cooperate with said manual actuating means over a range of 90° for locking the body in one of said indexed positions to positively align said cutting strand at selected twisted positions of 90° or less from an untwisted position of said cutting strand.

4. The guide of claim 1, wherein said pintles are arranged in vertically spaced horizontal pairs to support vertically spaced pairs of rollers thereon; the rollers of each pair thereof being mounted with their larger diameter portions in side-by-side laterally spaced, blade engaging relation to provide a blade receiving path therebetween; said rollers being reversible end-for-end on their respective pintles to place them in first and second operating positions for respectively guiding wide and narrow saw blades; said rollers in said first operating position having the larger diameter portions thereof at outer ends of said pintles for guiding a said wide blade and in said second operating position having said larger diameter portions at inner ends of said pintles, for guiding a said narrow blade.

5. The guide of claim 1, wherein said coaxially aligned end portions of each said roller are integral.

6. The guide of claim 1, wherein said coaxially aligned end portions of each said roller are separate and interchangeably positionable on said pintles.

* * * * *

UNITED STATES PATENT AND TRADEMARK OFFICE
CERTIFICATE OF CORRECTION

PATENT NO. : 5,410,934
DATED : May 2, 1995
INVENTOR(S) : Jacob Krippelz

It is certified that error appears in the above-identified patent and that said Letters Patent is hereby corrected as shown below:

```
Col. 6, line 25, after "strand" insert -- which is --.
Col. 6, line 16, "which is" have been deleted.
```

Signed and Sealed this

Sixteenth Day of April, 1996

Attest:

BRUCE LEHMAN

Attesting Officer

Commissioner of Patents and Trademarks